United States Patent
Junior

(10) Patent No.: US 11,321,140 B2
(45) Date of Patent: May 3, 2022

(54) MULTI-CLOUD FRAMEWORK FOR MICROSERVICE-BASED APPLICATIONS

(71) Applicant: EMC IP Holding Company LLC, Hopkinton, MA (US)

(72) Inventor: Jaumir Valença da Silveira Junior, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 16/171,554

(22) Filed: Oct. 26, 2018

(65) Prior Publication Data
US 2020/0133738 A1    Apr. 30, 2020

(51) Int. Cl.

| | |
|---|---|
| *G06F 9/50* | (2006.01) |
| *H04L 29/08* | (2006.01) |
| *G06F 8/60* | (2018.01) |
| *H04L 12/911* | (2013.01) |
| *G06F 9/48* | (2006.01) |
| *G06F 9/46* | (2006.01) |
| *H04L 67/00* | (2022.01) |
| *H04L 67/10* | (2022.01) |
| *H04L 47/70* | (2022.01) |

(52) U.S. Cl.
CPC ............ *G06F 9/5077* (2013.01); *G06F 8/60* (2013.01); *G06F 9/465* (2013.01); *G06F 9/4856* (2013.01); *H04L 47/822* (2013.01); *H04L 47/826* (2013.01); *H04L 67/10* (2013.01); *H04L 67/34* (2013.01); *G06F 2209/508* (2013.01)

(58) Field of Classification Search
CPC ............ H04L 47/788; H04L 29/08171; H04L 41/5054; H04L 12/24; G06F 8/41
USPC ......................................................... 709/226
See application file for complete search history.

(56) References Cited

U.S. PATENT DOCUMENTS

| | | |
|---|---|---|
| 8,417,938 B1 | 4/2013 | Considine et al. |
| 9,229,771 B2 | 1/2016 | Armour et al. |
| 9,448,791 B1 | 9/2016 | McFarlane |
| 9,483,259 B1 | 11/2016 | Lee |
| 9,608,931 B2 | 3/2017 | Sharma et al. |

(Continued)

OTHER PUBLICATIONS https://docs.microsoft.com/en-us/azure/azure-functions/.

(Continued)

*Primary Examiner* — Mahran Y Abu Roumi
(74) *Attorney, Agent, or Firm* — Ryan, Mason & Lewis, LLP

(57) ABSTRACT

A multi-cloud framework is provided for microservice-based applications. An exemplary method comprises maintaining a structural state of an application comprising a plurality of microservices hosted in a plurality of distinct cloud environments. The structural state of the application is maintained over time and comprises, for each microservice, an indication of the cloud environment that hosts the respective microservice. A source code is maintained for each of the plurality of microservices of the application and deployment instructions are maintained for each of the plurality of distinct cloud environments. The plurality of microservices of the application are deployed using the structural state of the application, the source code for each of the plurality of microservices and the deployment instructions for each of the plurality of distinct cloud environments.

20 Claims, 10 Drawing Sheets

(56) References Cited

U.S. PATENT DOCUMENTS

| | | | |
|---|---|---|---|
| 9,621,677 B1 | 4/2017 | Bradley | |
| 9,648,134 B2 | 5/2017 | Frank et al. | |
| 9,692,632 B2 | 6/2017 | Bhattacharya et al. | |
| 9,866,433 B1 | 1/2018 | Fakhouri | |
| 9,871,851 B2 | 1/2018 | Todd et al. | |
| 10,129,177 B2 | 11/2018 | Chang et al. | |
| 10,198,250 B1* | 2/2019 | Sharma | G06F 8/20 |
| 10,198,447 B2 | 2/2019 | Goswami et al. | |
| 10,379,910 B2 | 8/2019 | Balasubramanian et al. | |
| 10,515,005 B1 | 12/2019 | Burrell | |
| 10,560,345 B2 | 2/2020 | Patel et al. | |
| 10,592,391 B1 | 3/2020 | Anderson | |
| 10,915,303 B2 | 2/2021 | Back | |
| 10,983,901 B1 | 4/2021 | Pearce | |
| 2008/0225860 A1 | 9/2008 | Manion | |
| 2012/0131553 A1 | 5/2012 | Tsai | |
| 2012/0324417 A1 | 12/2012 | Somani | |
| 2013/0159365 A1 | 6/2013 | Boctor | |
| 2013/0212553 A1 | 8/2013 | Balasubramanian et al. | |
| 2014/0156813 A1 | 6/2014 | Zheng et al. | |
| 2014/0282456 A1 | 9/2014 | Drost et al. | |
| 2015/0263894 A1 | 9/2015 | Kasturi et al. | |
| 2015/0301810 A1 | 10/2015 | Sun | |
| 2016/0125185 A1 | 5/2016 | Wang | |
| 2016/0132310 A1 | 5/2016 | Koushik | |
| 2016/0226874 A1 | 8/2016 | Wiest | |
| 2017/0103192 A1 | 4/2017 | Hussey | |
| 2017/0111241 A1 | 4/2017 | Degioanni | |
| 2017/0147471 A1 | 5/2017 | Shadi | |
| 2017/0169228 A1 | 6/2017 | Brucker | |
| 2017/0201569 A1 | 7/2017 | Fu et al. | |
| 2017/0244593 A1* | 8/2017 | Rangasamy | H04L 12/4683 |
| 2017/0257432 A1* | 9/2017 | Fu | H04L 67/2823 |
| 2017/0351506 A1 | 12/2017 | Celikyilmaz | |
| 2018/0025276 A1 | 1/2018 | Hill | |
| 2018/0081740 A1 | 3/2018 | Syed et al. | |
| 2018/0103064 A1* | 4/2018 | Ahuja | H04L 63/20 |
| 2018/0157478 A1 | 6/2018 | Wong | |
| 2018/0196655 A1 | 7/2018 | Kapoor et al. | |
| 2018/0203792 A1 | 7/2018 | Ekambaram | |
| 2018/0204407 A1 | 7/2018 | Salemon | |
| 2018/0241642 A1* | 8/2018 | Patel | G06F 8/60 |
| 2018/0260301 A1* | 9/2018 | Podjarny | G06F 8/60 |
| 2018/0270122 A1* | 9/2018 | Brown | H04L 69/40 |
| 2018/0285353 A1 | 10/2018 | Ramohalli Gopala Rao et al. | |
| 2018/0300173 A1 | 10/2018 | Shimamura | |
| 2018/0302335 A1* | 10/2018 | Gao | H04L 43/0876 |
| 2018/0324119 A1* | 11/2018 | Ahuja | H04L 67/34 |
| 2018/0324204 A1* | 11/2018 | McClory | G06F 8/30 |
| 2018/0373516 A1 | 12/2018 | Gopal | |
| 2019/0007458 A1 | 1/2019 | Shulman | |
| 2019/0034181 A1 | 1/2019 | Kapoor et al. | |
| 2019/0235850 A1 | 8/2019 | Mukherjee | |
| 2019/0235852 A1 | 8/2019 | Bartolotta et al. | |
| 2019/0303018 A1 | 10/2019 | Huang | |
| 2019/0306236 A1* | 10/2019 | Wiener | H04L 67/1095 |
| 2019/0312899 A1 | 10/2019 | Shulman | |
| 2019/0373056 A1 | 12/2019 | Kalach | |
| 2019/0377556 A1 | 12/2019 | Mishra | |
| 2020/0004591 A1 | 1/2020 | Das | |
| 2020/0026511 A1 | 1/2020 | Swierc | |
| 2020/0026850 A1 | 1/2020 | Levin | |
| 2020/0034192 A1 | 1/2020 | Kandula et al. | |
| 2020/0036785 A1 | 1/2020 | Kandula et al. | |
| 2020/0073783 A1 | 3/2020 | Hortala | |
| 2020/0089515 A1 | 3/2020 | Hari | |
| 2020/0104236 A1 | 4/2020 | Creel | |
| 2020/0104532 A1 | 4/2020 | Anderson | |
| 2020/0133738 A1 | 4/2020 | Junior et al. | |
| 2020/0174907 A1 | 6/2020 | Lundquist | |
| 2020/0204618 A1 | 6/2020 | Agarwal | |
| 2020/0210218 A1 | 7/2020 | Lu et al. | |
| 2020/0213357 A1 | 7/2020 | Levin | |
| 2020/0218514 A1 | 7/2020 | Wang | |
| 2020/0218533 A1 | 7/2020 | Sharma | |
| 2020/0244772 A1 | 7/2020 | Luo et al. | |
| 2020/0257567 A1 | 8/2020 | Fontanari Filho et al. | |
| 2020/0272556 A1* | 8/2020 | Podjarny | G06F 8/60 |
| 2020/0314168 A1 | 10/2020 | Nauerz | |
| 2020/0382591 A1 | 12/2020 | Becker | |
| 2020/0410448 A1 | 12/2020 | Gadge | |
| 2020/0412538 A1 | 12/2020 | Rosado | |
| 2021/0011712 A1 | 1/2021 | Grant | |
| 2021/0056210 A1 | 2/2021 | Iyer | |
| 2021/0067324 A1 | 3/2021 | Valente | |
| 2021/0099459 A1 | 4/2021 | zhang et al. | |
| 2021/0109775 A1 | 4/2021 | Shen | |
| 2021/0110506 A1 | 4/2021 | Prakash | |
| 2021/0117417 A1 | 4/2021 | Hendrickson | |
| 2021/0132915 A1 | 5/2021 | Vankovic | |
| 2021/0144013 A1 | 5/2021 | Chen | |
| 2021/0263779 A1 | 8/2021 | Haghighat | |

OTHER PUBLICATIONS https://cloud.google.com/functions/.
https://en.wikipedia.org/wiki/Continuous_integration.
https://en.wikipedia.org/wiki/Continuous_deployment.
https://cloud.google.com/functions/docs/writing/http.
https://docs.microsoft.com/en-us/azure/azure-functions/functions-bindings-http-webhook.
https://searchvmware.techtarget.com/definition/VMware-VirtualCenter.
https://www.ibm.com/support/knowledgecenter/en/SSBS6K_3.1.0/mcm/getting_started/introduction.html.
https://kubernetes.io.
https://en.wikipedia.org/wiki/Infrastructure_as_a_service.
https://en.wikipedia.org/wiki/URL_redirection.
https://en.wikipedia.org/wiki/Google_Storage.
https://en.wikipedia.org/wiki/Microsoft_Azure#Storage_services.
https://en.wikipedia.org/wiki/Class_(computer_programming)#Abstract_and_concrete.
https://docs.microsoft.com/en-us/dotnet/csharp/programming-guide/delegates/.
https://docs.microsoft.com/en-us/rest/api/billing.
https://cloud.google.com/billing/reference/rest/.
https://en.wikipedia.org/wiki/Syntax_(programming_languages).
https://en.wikipedia.org/wiki/Regular_expression.
https://en.wikipedia.org/wiki/Source-to-source_compiler.
https://en.wikipedia.org/wiki/GitHub.
https://en.wikipedia.org/wiki/Create,_read,_update_and_delete.
https://www.icann.org/.
https://developer.mozilla.org/en-US/docs/Glossary/Signature/Function.
https://developer.mozilla.org/en-US/docs/Learn/JavaScript/Building_blocks/Return_values.
https://vmware.my.salesforce.com/apex/page?name=vrealizesuite.
https://dell.anaqua.com/anaqua/Survey/Survey.aspx?SurveyAnswerGroupid=81479124.
https://docs.microsoft.com/en-us/azure/active-directory/.
U.S. Appl. No. 16/554,903 entitled, "Multi-Cloud Operations Center for Function-Based Applications", filed on Aug. 29, 2019.
U.S. Appl. No. 16/587,716 entitled, "Serverless Application Center for Multi-Cloud Deployment of Serverless Applications", filed on Aug. 29, 2019.
"Microservices", downloaded from https://en.wikipedia.org/wiki/Microservices on Oct. 25, 2018.
"Application programming interface", downloaded from https://en.wikipedia.org/wiki/Application_programming_interface on Oct. 25, 2018.
Junod, Betty, "Container as a Service (CaaS) as your New Platform for Application Development and Operations" downloaded from CaaS: https://blog.docker.com/2016/02/containers-as-a-service-caas/ on Oct. 25, 2018.
"Function as a Service", downloaded from https://en.wikipedia.org/wiki/Function_as_a_service on Oct. 25, 2018.
"Microsoft Azure", downloaded from https://en.wikipedia.org/wiki/Microsoft_Azure on Oct. 25, 2018.
"Google Cloud Platform", downloaded from https://en.wikipedia.org/wiki/Google_Cloud_Platform on Oct. 25, 2018.

(56) References Cited

OTHER PUBLICATIONS

"Pivotal Web Services", downloaded from https://run.pivotal.io/ on Oct. 25, 2018.
"Unified Cloud Management", downloaded from https://www.unigma.com/, on Oct. 25, 2018.
"RightScale Cloud Management", downloaded from https://www.rightscale.com/, on Oct. 25, 2018.
"Cloud Cruiser: Cloud Cost Management—Cloud Spending", https://www.cloudcruiser.com/, on Oct. 25, 2018.
"Object-oriented-programming", downloaded from https://en.wikipedia.org/wiki/Object-oriented-programming on Oct. 25, 2018.
"Cron", downloaded from https://en.wikipedia.org/wiki/Cron on Oct. 25, 2018.
Dinitto et al., "Model-Driven Development and Operation of Multi-Cloud Applications, The MODA Clouds Approach" https://www.modaclouds.eu/, downloaded Oct. 19, 2018.
https://en.wikipedia.org/wiki/Function_as_a_service, downloaded Aug. 14, 2019.
https://www.unigma.com/, downloaded Aug. 15, 2019.
https://www.rightscale.com/, downloaded Aug. 15, 2019.
https://www.cloudcruiser.com/, downloaded Aug. 15, 2019.
https://en.wikipedia.org/wiki/Object-oriented_programming, downloaded Aug. 15, 2019.

* cited by examiner

FIG. 8

```
RegisterCloud(in cloud_name, in cloud_type, in cloud_region, in service_types, in cloud_account, in cloud_credentials, in cloud_URL)
DeregisterCloud()
GetClouds()
RegisterApplication(in AppName, in List<cloud_id>)
UploadApplication(in Application, in Dict<Cloud, ServiceType>, in local_path_application)
UploadAppService(in Application, in ServiceType, in local_path_service)
GetApplicationServices(in Application)
StartApplication(in Application, in Cloud)
StopApplication(in Application, in Cloud)
StartApplicationService(in Application, in Service, in Version, in Cloud)
StopApplicationService(in Application, in Service, in Cloud)
ChangeServiceVersion(in Application, in Service, in Version, in Cloud)
RemoveApplication(in Application, in Cloud)
RemoveAppService(in Application, in Service, in Version, in Cloud)
MoveApplication(in Application, in Cloud_from, in Cloud_to)
MoveAppService(in Application, in Service, in Cloud_from, in Cloud_to, in ServiceType)
GetApplicationStatus(in Application, in Cloud)
```

800

GetCloudPriceTable(in Cloud)
GetApplicationBill(in Application, in TimestampRange, in Cloud)
RegisterMonitor(in URL)
DeregisterMonitor()
ConfigureApplicationMonitoring(in Application, in Service, in List<Metric>)
GetApplicationMonitoringConfiguration(in Application)
StartApplicationMonitoring(in application)
StopApplicationMonitoring(in Application)
GetApplicationMonitoringReport(in Application, in StartTime, in Endtime)

RegisterScheduler(in scheduler_name, in scheduler_URL)
DeregisterScheduler()

```
GetCloudStatus()
UploadApplication(in app_name, in LocalPath, in ServiceType)
UploadAppService(in app_name, in LocalPath)
StartApplication(in app_name)
StopApplication(in app_name)
StartAppService(in app_name, in Service, in Version)
StopAppService(in app_name, in Service)
ChangeServiceVersion(in app_name, in Service, in Version)
RemoveApplication(in app_name)
RemoveAppService(in app_name, in Service, in Version)
GetApplicationStatus(in app_name)
GetCloudPriceTable()
GetApplicationServiceBill(in app_name, in List<service_name>, in TimestampRange)
```

FIG. 10  1000

```
AttachRepository(in repository_connection)
StartMonitoringServiceAsync(in app_name, in service_name, in list<Metric>)
StopMonitoringServiceAsync(in app_name, in service_name)
GetServiceMonitoringCapabilities(in ServiceType)
GetMonitoringReport(in app_name, in StartTime, in EndTime)
```

FIG. 11
1100

RegisterMonitorRepository(in Repository)
RegisterMonitorAgent(in MonitorAgent)
DeregisterMonitorAgent(in MonitorAgent)
GetMonitorAgents()
ConfigureCloudServiceMonitoring(in cloud_name, in Service, in List<Metric>)
GetCloudServiceMonitoringConfiguration(in cloud_name)
StartCloudMonitoring(in app_name, in cloud_name)
StopCloudMonitoring(in app_name, in cloud_name)
GetCloudMonitoringReport(in app_name, in cloud_name, in StartTime, in EndTime)

FIG. 12
1200

CreateClot(in List<Service>, in app_name)
RemoveClot(in clot_name, in app_name)
SetOptimizationMetric(in app_name, in service_name, in metric_name, in min_max, in sample_interval)
StartApplicationScheduler(in ListOnly, in app_name)
StopApplicationScheduler(in app_name)
GetApplicationMovePlan(in app_name)
ExecApplicationMovePlan(in MovePlan, in app_name)
RegisterMonitorRepository(in monitor_repository_connection)

MULTI-CLOUD FRAMEWORK FOR MICROSERVICE-BASED APPLICATIONS

FIELD

The field relates generally to the deployment of software applications.

BACKGROUND

Software applications are increasingly deployed as a collection of microservices. In addition, a number of software providers are increasingly using multiple cloud environments to host their applications and/or data. A need remains for improved techniques for deploying microservice-based applications across multiple cloud environments.

SUMMARY

In one embodiment, a method comprises maintaining a structural state of an application comprising a plurality of microservices hosted in a plurality of distinct cloud environments, wherein the structural state of the application is maintained over time and comprises, for each microservice, an indication of the cloud environment that hosts the respective microservice; obtaining a source code for each of the plurality of microservices of the application and deployment instructions for each of the plurality of distinct cloud environments; and deploying the plurality of microservices of the application using the structural state of the application, the source code for each of the plurality of microservices and the deployment instructions for each of the plurality of distinct cloud environments.

In some embodiments, a resource usage of one or more of the microservices of the application is monitored based on one or more user-defined metrics. Queries are optionally processed with respect to the resource usage.

In at least one embodiment, one or more of the microservices are moved to a different cloud environment using one or more of (i) a manual intervention of a user, and (ii) an automated optimization process based on resource usage data and collected predefined optimization parameters.

Other illustrative embodiments include, without limitation, apparatus, systems, methods and computer program products comprising processor-readable storage media.

BRIEF DESCRIPTION OF THE DRAWINGS

FIGS. 8 through 12 illustrate a number of exemplary application programming interfaces exposed by a number of the components of FIG. 7, according to various embodiments;

DETAILED DESCRIPTION

Figure 1:
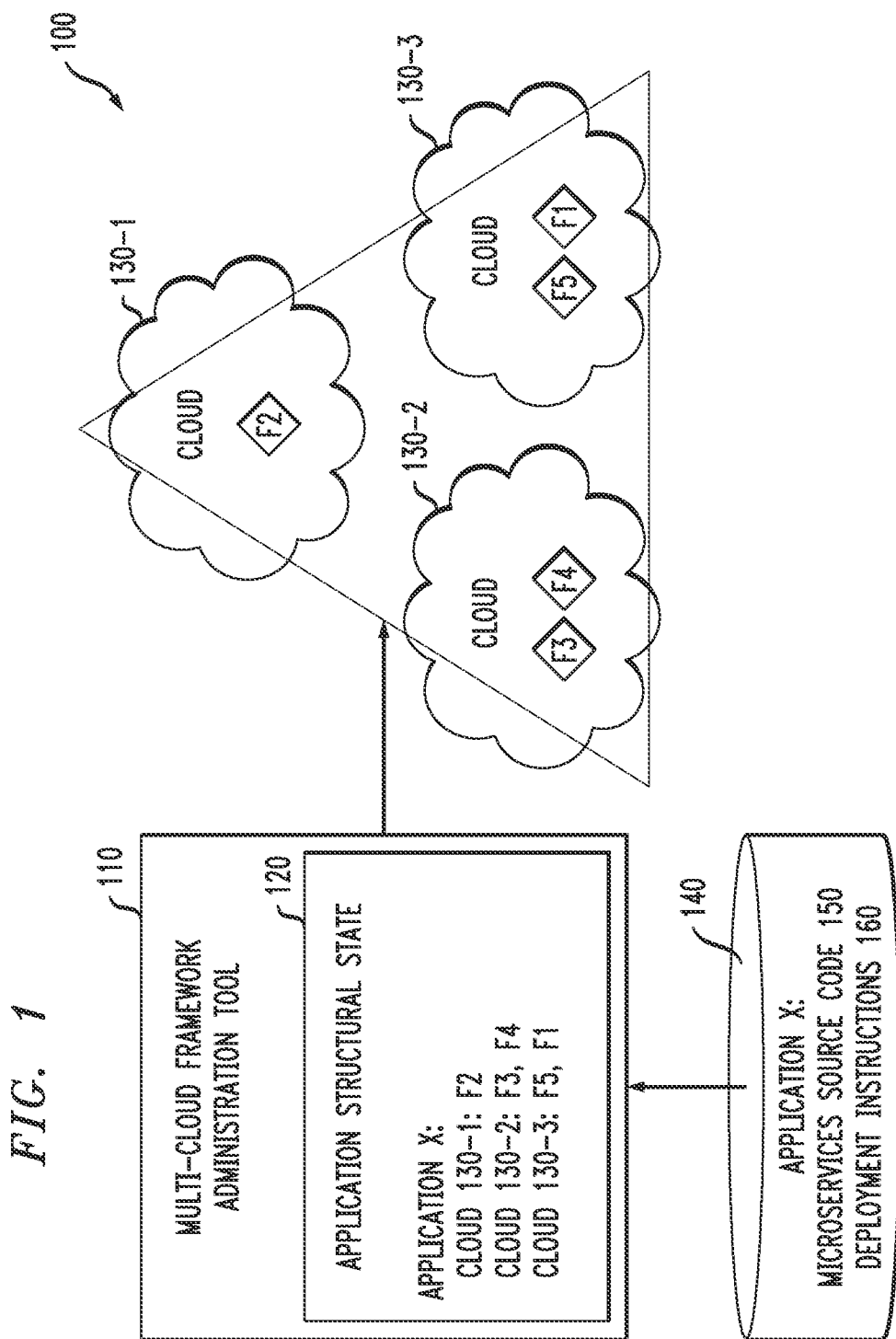
FIG. 1 illustrates an exemplary multi-cloud application environment where a microservice-based application is deployed, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide a multi-cloud framework for microservice-based applications.

In one or more embodiments, a multi-cloud framework is provided for stateless microservice-based applications that can be implemented across multiple cloud environments. A user creates an application as a series of code fragments corresponding to individual microservices, and each microservice can be implemented using different technologies, such as Container as a Service (CaaS) and Function as a Service (FaaS). The application microservices can thus reside in different cloud environments (e.g., public clouds and/or private clouds). The disclosed framework is responsible for deploying the application and keeping track of the structural state of the application. Generally, the structural state of an application identifies the clouds that run particular versions of the microservices at any given point in time.

In one or more embodiments, the disclosed multi-cloud framework performs the following tasks, at an application level:

application billing: report how much each application and each application microservice costs at defined intervals of time;

application monitoring: monitor the resource usage of each application and application microservice according to metrics defined by end users, storing resource usage information in, for example, a monitoring repository;

moving portions of an application among different clouds; and application optimization: by providing the microservices monitoring information to an application scheduler/optimizer, the application scheduler/optimizer can decide to move parts of an application among clouds in order to substantially optimize the application according to user defined optimization parameters (e.g., cost).

In at least one embodiment, the disclosed multi-cloud framework allows enterprises to build software with the following characteristics:

a software architecture where an application is built comprising multiple microservices;

application microservices can run on different cloud technologies, such as CaaS or FaaS, and the microservices can be hosted in multiple clouds (e.g., public clouds as well as private, on-premises clouds);

users can query at a given moment the list of microservices that comprise an application, as well as where the microservices are running and which microservice version is deployed at each cloud;

users will be able to define metrics in order to monitor the resource usage of application microservices and query for resource usage; and users will be able to migrate application microservices among clouds, either manually or automatically by use of an application optimizer/scheduler.

In some embodiments, the disclosed multi-cloud framework performs application management tasks, such as registering or deregistering clouds that will host applications, uploading and removing applications to/from clouds, and starting and stopping microservices.

FIG. 1 illustrates an exemplary multi-cloud application environment 100, according to one embodiment of the disclosure. As shown in FIG. 1, the exemplary multi-cloud application environment 100 comprises a multi-cloud framework administration tool 110 that maintains a structural state 120 for one or more applications, such as an application X. Application X comprises five microservices, F1, F2, F3, F4 and F5 that run in three different cloud environments 130-1 through 130-3. In one or more embodiments, the application structural state 120 comprises an indication of the cloud environment 130-1 through 130-3 that hosts each microservice F1 through F5 of the application X, at a given point in time.

Thus, in the example of FIG. 1, cloud environment 130-1 hosts microservice F2, cloud environment 130-2 hosts microservices F3 and F4, and cloud environment 130-3 hosts microservices F5 and F1.

In one or more embodiments, the multi-cloud framework administration tool 110 keeps the application structural state 120 up-to-date, as new microservices are created or deleted on different cloud environments 130.

The disclosed multi-cloud framework allows for the use of multiple microservice types, such as CaaS and FaaS for the implementation of microservices. In this manner, a user can initially decide to execute one or more microservices in a cloud environment 130 using a CaaS microservice type and then decide to migrate the one or more microservices to another cloud environment 130 using a FaaS microservice type, as discussed further below.

It is noted that the disclosed multi-cloud framework is optionally extensible and allows for the registering of other microservice types other than CaaS or FaaS, as would be apparent to a person of ordinary skill in the art.

As shown in FIG. 1, the exemplary multi-cloud framework administration tool 110 accesses a data store such as a local repository 140 comprising a source code 150 for the plurality of microservices of the application and deployment instructions 160 for each of the plurality of distinct cloud environments 130-1 through 130-3. Generally, as discussed further below, the exemplary multi-cloud framework administration tool 110 deploys the plurality of microservices F1 through F5 of the application X using the structural state 120 of the application, the source code 150 for the plurality of microservices F1 through F5 and the deployment instructions 160 for each of the plurality of distinct cloud environments 130.

In various embodiments, the local repository 140 could be any kind of structured data repository, ranging from a folder structure in the operating system file system to a full-fledged commercial Database Management System, depending on organizational concerns such as Information Technology infrastructure norms or security policies. One important consideration is the separation of source code 150 and installation/configuration files. For instance, imagine that Application X is comprised of three microservices, F1, F2 and F3, and that there are three possible places for the microservices to be installed:

Cloud A as CaaS;
Cloud A as FaaS; and
Cloud B as CaaS.

Figure 2:
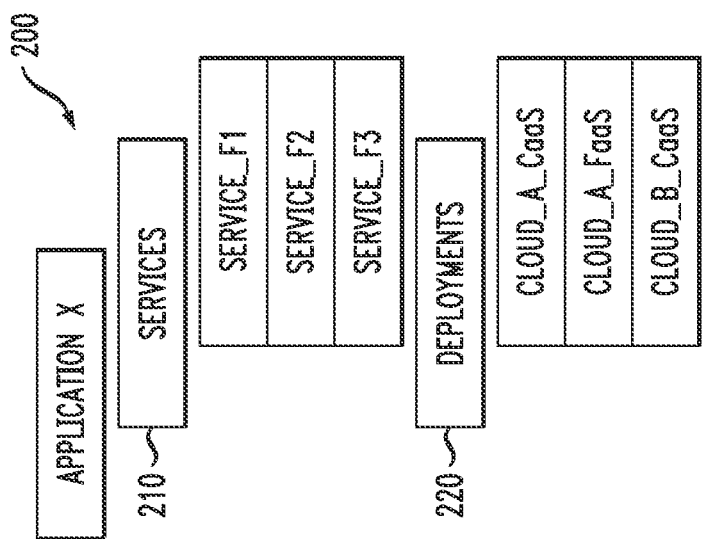
FIG. 2 illustrates an exemplary logical hierarchical structure for deployment of the exemplary application of FIG. 1, according to at least one embodiment of the disclosure.

FIG. 2 illustrates an exemplary logical hierarchical structure 200 for deployment of the exemplary application X, according to at least one embodiment of the disclosure. As shown in FIG. 2 a Services node 210 comprises sub-nodes with the source code 150 of each microservice F1 through F3, and the Deployments node 220 comprises deployment instructions 160 indicating how to deploy each microservice type (e.g., installation scripts), according to the cloud (A or B) and to the service type (CaaS or FaaS) provided by the cloud. The exemplary hierarchical structure 200 can also contain other files necessary for the service to run, such as images and third-party libraries.

Consider the difference between deploying an application and starting/stopping an application. Deploying an application means merely uploading the application files to a storage area in the cloud, so it can later instantiate the service (e.g., run it).

Now consider a specific cloud that offers both capabilities, CaaS and FaaS, and that has the source code files for a service already uploaded. If both deployment scripts are also uploaded, this service can be instantiated either as FaaS or as CaaS.

In some embodiments, a cloud 130 can be any private cloud (e.g., Pivotal Cloud Foundry) or public cloud (e.g., Microsoft Azure or Google Cloud Platform (GCP)). In the case of public clouds, for example, different cloud regions (e.g., geographic locations) can be seen as different clouds. For example, different cloud regions may comprise the following:

Azure_US_South;
Azure_US_West; and
GCS_US_Central1.

Before creating an application, the multi-cloud framework administration tool 110 provides methods that allow users to register clouds in the multi-cloud framework. The registering process obtains credentials (e.g., access tokens) and endpoints (e.g., HTTP (Hypertext Transfer Protocol) URLs (uniform resource locators)) so the disclosed multi-cloud framework can invoke cloud services via their native commands. The disclosed multi-cloud framework will then maintain a table of registered clouds with their credentials and endpoints.

Moreover, for each type of Cloud that takes part in the multi-cloud system, a piece of the disclosed multi-cloud framework is developed specifically to interact with the cloud's native application programming interface (API), as discussed below.

Figure 3:
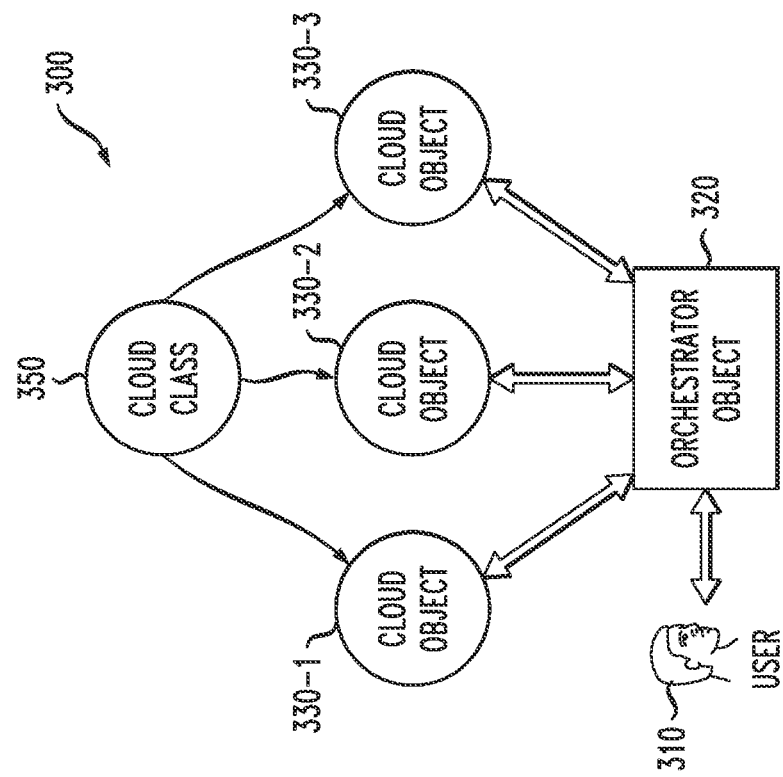
FIG. 3 illustrates an exemplary cloud-specific orchestration environment, according to one or more embodiments.

FIG. 3 illustrates an exemplary cloud-specific orchestration environment 300, according to one or more embodiments. As shown in FIG. 3, an exemplary orchestrator object 320 interacts with a plurality of cloud objects 330-1 through 330-3 of a cloud class 350, via a common interface. The exemplary orchestrator object 320 communicates with end-users 310 and issues commands to cloud-specific components, such as cloud objects 330-1 through 330-3. The orchestrator object 320 as well as the cloud objects 330 can run either in local desktops or in the cloud. More importantly, a single orchestrator object 320 instance can optionally control the entire multi-cloud environment.

Along with the orchestrator object 320, there are cloud-specific objects 330 for each cloud that the system supports. Each cloud object 330 implements a common set of commands defined in a common interface. For example, all cloud objects should in principle expose the same API. As a consequence, the orchestrator object 320 may issue the same command to all clouds 130 supported by the multi-cloud framework, and each cloud-specific component will in turn execute the command by using the native API provided by the cloud provider. For instance, assume that Clouds 130-1 and Cloud 130-2 are both Microsoft Azure clouds, and Cloud 130-3 is a Google Cloud. In this case, cloud objects 330-1 and 330-2 could be components responsible for executing commands in clouds 130-1 and 130-2, respectively, using the Azure REST API, while cloud object 330-3 could be the component responsible for executing commands in cloud 130-3, using the GCP REST API.

For example, suppose the user 310 issues the following command:

StopApplication(someApplication), in order to stop all microservices that are part of Application someApplication from running. When the orchestrator object 320 executes this command, the orchestrator object 320 retrieves a list of all clouds 130 that have services that are part of someApplication, and the orchestrator object 320 will issue a command to each corresponding cloud object 330 to stop the microservices that they host and that are part of the Application, with the following command:

StopApplicationService(someApplication, List<microservices>).

Monitoring and Optimizing

Each cloud 130 should offer the possibility for the usage of its resources to be monitored and, in fact, public clouds typically do so. The disclosed multi-cloud framework leverages these capabilities and lets users decide which resources they want to monitor, if any, either for each microservice or for the whole application. The multi-cloud framework then asks the clouds to send the desired monitoring information at specified intervals. With the collected information, the optimizer/scheduler can decide if there is a better way of allocating microservices among the clouds.

In some embodiments, the monitoring and optimization processes rely on a MonitorRepository, as discussed further below in conjunction with FIG. 7. The MonitorRepository can be either an in-memory structure or a full-fledged database. The framework monitoring component stores monitoring data received from different clouds 130 in such repository, and the optimizer component uses this information to calculate, based on past information, what would be a better placement of microservices among the clouds, as discussed below.

Monitoring

The disclosed multi-cloud framework optionally allows for the definition of metrics that can be monitored over time. A metric comprises:

a name—a name that will be used throughout the multi-cloud framework, such as 'CPU', 'Memory', or 'OverallCost';

a unit—a measure unit, such as GHz, GB, or US$; and a timestamp range—a time interval, such as 'hour', or 'day'.

This metric definition allows for two important steps optionally performed by the framework administrator on setting up the whole framework monitoring process:

to specify a list of metrics that a cloud 130 can monitor for each service type (e.g., CaaS, FaaS or another custom microservice type); and to define a list of metrics that needs to be collected for each Application microservice at a given time interval.

Once these pieces of information are configured in the multi-cloud framework, a user 310 can issue a command so the application can start to be monitored. In this case, the user 310 would issue a command to the orchestrator object 320 such as:

StartApplicationMonitoring (someApplication)

and the orchestrator object 320, in turn, issues a command to each cloud 130 that hosts microservices that belong to someApplication:

StartMonitoringServiceAsync(app_name, service_name, List<Metric>).

At this stage, each cloud 130 can start to send metric values to the MonitorRepository, as discussed further below in conjunction with FIG. 7. A metric value is optionally organized as a record called Measure and comprises:

a timestamp—timestamp of the instant the measure was taken;

a name—a name that will be used throughout the framework, such as 'CPU', 'Memory', or 'OverallCost';

a unit—a measure unit, such as GHz, GB, or US$; and a value—the value that was gauged by the cloud 130.

In a nutshell, the orchestrator object 320 instructs the clouds 130 about which metrics they should work with, and the clouds 130 send back the measures related to those metrics.

Optimizing

The aim of the optimization is to come up with a move plan, if needed. A move plan is a map depicting, for an application, where each microservice resides and where each microservice should be moved. To accomplish this, the optimizer needs resource usage data and an optimization metric.

An optimization metric can optionally be explicitly set by the user 310 for each application. Along with the metric to be optimized, the user 310 needs to inform the orchestrator object 320 if this metric is supposed to be substantially maximized or substantially minimized.

The MonitorRepository stores all measures sent by different clouds 130, and the MonitorRepository organizes the measures in records with the following exemplary structure:

Application_name|service_name|Measure.

Based on the specified optimization metric, the optimizer uses the data in the MonitorRepository to analyze the resource usage of each application and to come up with a move plan. The orchestrator object 320 can use this move plan to actually move the microservice among clouds 130. A move plan is a map where each record can have, for example, the following exemplary format:

App_name|service_name|current_cloud_name|current_ServiceType|new_cloud_name|new_cloud_type.

The optimization algorithm used to create the move plan is outside the scope of the present disclosure. Off-the-shelf algorithms can be used, or new algorithms can be created, as would be apparent to a person of ordinary skill in the art. Generally, an optimization algorithm can be plugged into the disclosed multi-cloud framework, as the needed parameters for such algorithms are readily available.

Current software applications, even microservice-based software applications designed to work in a cloud 130, do not have a multi-cloud implementation, in the sense that you cannot design an application from the beginning to have its microservices spread among clouds and yet keep the logical view of the application at each moment. For example, how much an application is consuming, in relation to defined resources, cannot easily be measured, or even how much it will cost to run an application for a given time period on a public cloud. For instance, if an application comprises seven microservices running on public cloud A and nine microservices running on an on-premise cloud B, there are solutions in the market that will indicate how much your virtual machines/containers are spending on each cloud 130, but the available solutions will not indicate how much the application as a whole (all microservices) are consuming.

Companies in various business segments are increasingly using multiple clouds to host their applications or data. In parallel, modern techniques for software construction are becoming increasingly more popular:

at the design level, microservices-oriented architectures address the problem of DevOps agility: the ability to quickly evolve a complex software, by breaking the software into small pieces that can be deployed and versioned separately while the software continues to run with no interruptions; and at the implementation level, two cloud paradigms are well suited to realize the concept of microservices: CaaS and FaaS.

At the present time, there is no multi-cloud software framework that allows for the use of these two paradigms simultaneously and the exploitation of its advantages. Existing solutions are typically based on virtual machines in order to utilize predefined metrics (e.g., CPU and/or memory).

There are multi-cloud software solutions in the market that will allow for offline migration of virtual machines/containers, but with no distinction of what is inside a virtual machine or container. Virtual machines and containers are treated as infrastructure resources, and they will not be able to respond easily to tasks such as migrating an entire application or parts of an application from one cloud to another, while the logical view of the application is maintained. Moreover, optimization at the application level (e.g., the ability to recommend the best clouds for each application microservice to be hosted) simply does not exist.

Multi-Cloud Framework Using Application Structural State

One or more embodiments of the disclosure provide a multi-cloud framework that allows for the creation of multi-cloud microservice-based applications.

Figure 4:
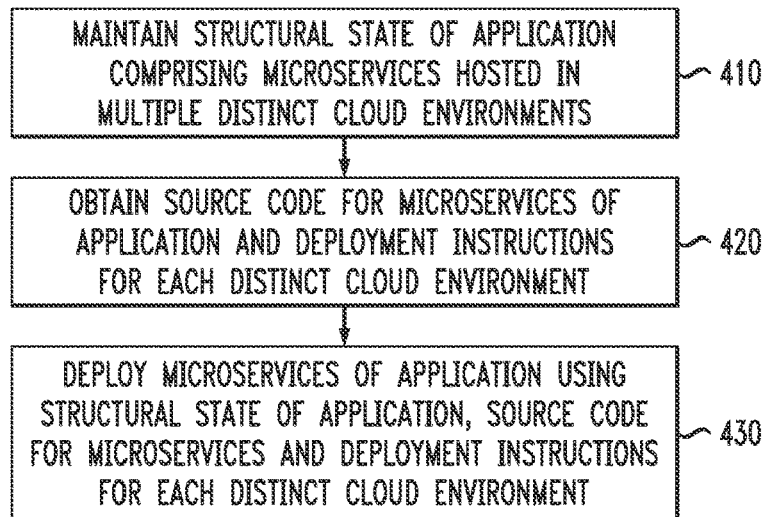
FIG. 4 is a flow chart illustrating an exemplary implementation of a multi-cloud framework process for microservice-based applications using the application structural state of FIG. 1, according to one embodiment of the disclosure.

FIG. 4 is a flow chart illustrating an exemplary implementation of a multi-cloud framework process 400 for microservice-based applications using the application structural state 120, according to one embodiment of the disclosure.

As shown in FIG. 4, the exemplary multi-cloud framework process 400 initially maintains the structural state 120 of an X application comprising microservices F hosted in multiple distinct cloud environments 130 during step 410.

Thereafter, during step 420, the exemplary multi-cloud framework process 400 obtains the source code 150 for the microservices F of the application X and the deployment instructions 160 for each distinct cloud environment 130.

Finally, the microservices F of the application X are deployed during step 430 using the structural state 120 of application, the source code 150 for the microservices F, and the deployment instructions 160 for each distinct cloud environment 130.

In one or more embodiments, logical components are (loosely) represented according to the Object-Oriented Programming paradigm. The notation used herein is a means of logically grouping components and does not suggest or reinforce any kind of implementation, as would be apparent to a person of ordinary skill in the art. In this paradigm, logical components are called classes—they act as a blueprint for the creation of objects and they describe which operations objects can perform, as well as what information an object stores internally (its variables). An object is what exists in memory and interacts with others to accomplish the intentions of the program. Components are referred to herein as classes to reinforce the conceptual level context, and not the implementation level.

Cloud Type and Service Type

Figure 5:
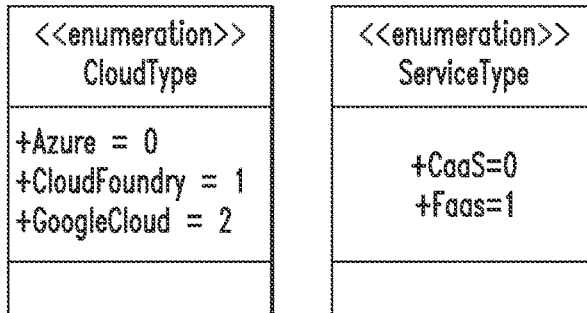
FIG. 5 illustrates exemplary cloud type and service type classes, according to some embodiments.

FIG. 5 illustrates exemplary cloud type and service type classes 500, according to some embodiments. As shown in FIG. 5, a CloudType defines the provider of a specific Cloud 130, either public or on-premises. CloudType examples include commercial clouds, such as Microsoft Azure or Google Cloud Platform, or private clouds such as Azure Stack or Pivotal Cloud Foundry.

A ServiceType defines how a service is being implemented, such as CaaS or FaaS.

As noted above, the disclosed multi-cloud framework is extensible. Thus, both cloud type and service type classes allow users to add new cloud providers (either public or on-premises) as well as service types that clouds offer.

Service and Version

Figure 6:
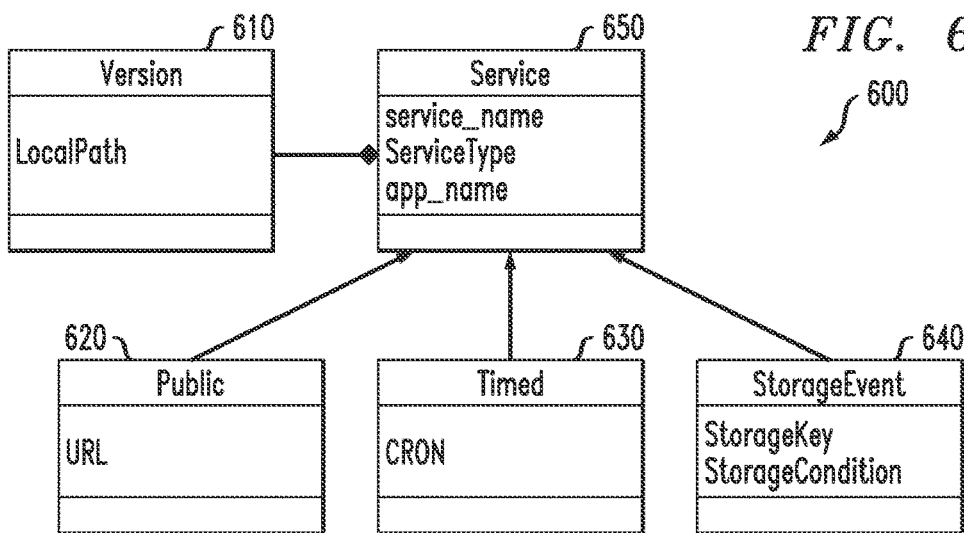
FIG. 6 illustrates a specialization of microservices, according to at least one embodiment of the disclosure.

FIG. 6 illustrates a specialization 600 of microservices, according to at least one embodiment of the disclosure. Generally, a Service class 650 represents a microservice (the terms "service" and "microservice" are generally used with the same meaning herein). The Service class 650 has several subclasses, to model different requirements of different microservices. This list of subclasses is extensible, and new subclasses can be added. In the example of FIG. 6, a number of exemplary subclasses represent services of major public providers:

a Public class 620—accepts requests and send responses via networking common architectures such as REST over HTTP/HTTP;

a Timed class 630—executed at defined schedule using CRON tables (e.g., a time-based job scheduler);

a StorageEvent class 640—executed when notified about a defined Condition, such as a new file that is uploaded to a known storage area.

Each service can store multiple versions, using a Version class 610; therefore, each version has a local path where the files related to the version are stored. The disclosed multi-cloud framework allows for an application to upgrade or downgrade a service version.

Logical Architecture

Figure 7:
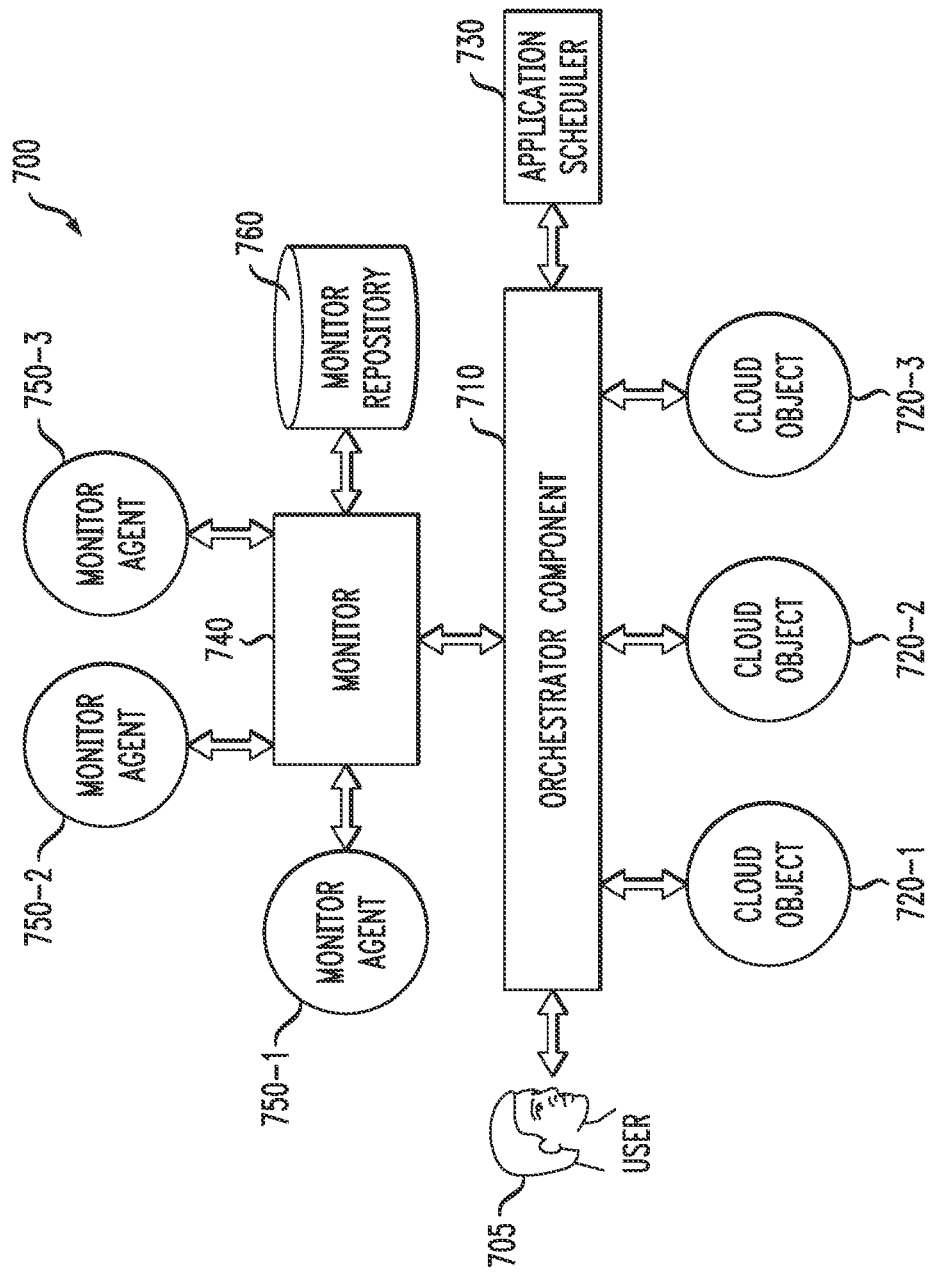
FIG. 7 illustrates an exemplary logical architecture for the disclosed multi-cloud framework, according to an embodiment.

FIG. 7 illustrates an exemplary logical architecture 700 for the disclosed multi-cloud framework, according to an embodiment. As shown in FIG. 7, the exemplary logical architecture 700 comprises an orchestrator component 710, an application scheduler 730 and a monitor 740.

The orchestrator component 710 is the main coordinator of the multi-cloud application environment 100 of FIG. 1. The orchestrator component 710 allows user 705 to interact with the disclosed multi-cloud framework via standard operations, discussed below, so the multi-cloud framework can provide three exemplary functionalities:

orchestration—keeping the coherence of the application among clouds 130, allowing for deployment, removal or relocation of microservices;

resource monitoring—the orchestrator component 710 communicates with the monitor object 740, which in turn communicates with monitor agents 750-1 through 750-3 for different clouds, so as to collect user-defined metric values; and application scheduling—the orchestrator component 710 communicates with the application scheduler 730 so the application scheduler 730 can use data collected by the monitor 740 to calculate and suggest a move plan back to the orchestrator component 710.

One orchestrator component 710 can reside on a local desktop and will allow the cloud administrator to manage the multi-cloud application environment 100 of FIG. 1, with help of the other cloud objects depicted in FIG. 7.

In one or more embodiments the orchestrator component 710 stores a dictionary containing the structural state 120 of each application:

---
app_name
-Dict<Cloud, Dict<Service,(active_version, List<Version>)>>

---

Each time a user calls an operation that is supposed to be performed on an application, the orchestrator component 710 uses this dictionary to know which clouds host which microservices of that application, and in turn the orchestrator component 710 calls the cloud-specific objects to carry on operations specific to the services that each cloud hosts.

The orchestrator component 710 object also keeps the URL for the monitor 740 and the application scheduler 730, so the orchestrator component 710 can ask these two objects to execute operations related to Monitoring and Application Scheduling. The Monitor 740 and the Application Scheduler 730 reside in principle in the same device as the orchestrator component 710, but they can also reside on any cloud, as an alternative implementation, as would be apparent to a person of ordinary skill in the art.

Each cloud 130 can be classified according to a CloudType and, for each cloud 130 that will be part of the multi-cloud application environment 100 of FIG. 1, there is a cloud object 720 running that corresponds to that CloudType. These Cloud objects 720-1 through 720-3 can reside either in their respective Cloud or in the same device as the orchestrator 710—both implementations are possible. The cloud object 720 receives orders from the orchestrator component 710 and manages services in the Cloud 130 that the cloud object 720 is responsible for.

In one or more embodiments, there are different implementations of cloud objects 720, one for each supported CloudType. The various cloud objects 720 implement substantially the same list of operations in some embodiments (e.g., the same API that the orchestrator uses to communicate with them). The exemplary logical architecture 700 of FIG. 7 allows for the orchestrator component 710 to talk to all clouds 130 using a unified interface, and each cloud object 720 will use native cloud APIs (those of either public or on-premises clouds) to carry out the operations.

In a similar manner as cloud objects 720, each cloud (e.g., either public or on-premises clouds) should have a monitor agent object 750-1 through 750-3 running, either on the respective cloud 130 or in the same device as the monitor object 740—both implementations are possible. The monitor agent object 750 is responsible for monitoring user-defined metrics related to microservices that are allocated on one specific cloud and for sending the metrics data to a user-defined repository, which can optionally reside on the same cloud 130.

While different cloud objects 720 exist for different CloudTypes, different monitor agents 750 also exist for different CloudTypes, because they use the native-provided APIs to carry out their operations. In one or more embodiments, the different monitor agents 750 implement substantially the same API.

The monitor object 740 communicates with the different monitor agents 750 in order to order them to start or stop monitoring microservices. The monitor object 740 receives monitoring reports from each monitor agent 750 responsible for monitoring clouds 130 and aggregates them in reports that are saved to a repository. This repository with aggregated data can be used to send monitoring reports to the orchestrator component 710 or the repository can be used by the application scheduler 730 to create move plans.

The monitor 740 keeps information about monitor agents 750, specifically which microservices are being monitored by which monitor agents 750 in which cloud 130 and which metrics are being monitored for each microservice.

As shown in FIG. 7, a monitor repository 760 stores all measures sent by different clouds 130, and the monitor repository 760 organizes the measures in records with the following exemplary structure:

Application_name|service_name|Measure.

The application scheduler 730 uses the data accumulated in the monitor repository 760 used by the monitor 740 to analyze the accumulated data and create a move plan. It also allows the users to create Clots. A clot is a list of microservices that cannot be moved separately. Either they are moved together or they do not take part in the move plan.

In some embodiments, the application scheduler 730 is a single object which optionally lives on the same site as the monitor repository 760.

While the orchestrator component 710, the application scheduler 730 and the monitor 740 are separate components in the exemplary logical architecture 700 of FIG. 7, an alternate implementation is discussed further below in conjunction with FIG. 13. Likewise, while the cloud objects 720 and monitor agent objects 750 are separate components in the exemplary logical architecture 700 of FIG. 7, alternate implementations are possible, as would be apparent to a person of ordinary skill in the art. The embodiment of FIG. 7 allows for scalability (each logical component being a separate executable code component). Moreover, the framework model can be extended to a model that accommodates multiple monitor objects 740 and application scheduler objects 730.

FIG. 8 illustrates an exemplary API 800 exposed by the orchestrator component 710 of FIG. 7, according to at least one embodiment.

FIG. 9 illustrates an exemplary API 900 exposed by the cloud objects class 720 of FIG. 7, according to an embodiment.

FIG. 10 illustrates an exemplary API 1000 exposed by the monitor agent class 750 of FIG. 7, according to one or more embodiments of the disclosure.

FIG. 11 illustrates an exemplary API 1100 exposed by the monitor class 740, according to one embodiment of the disclosure.

FIG. 12 illustrates an exemplary API 1200 exposed by the application scheduler class 730 of FIG. 7, according to some embodiment of the disclosure.

Flow of Operations

A number of representative examples are provided of how the framework components interact via their APIs of FIGS. 8 through 12, to demonstrate the overall operation. These examples are intended as guides to an implementation and not as a rigid implementation blueprint (e.g., changes can be adopted depending on specific implementation requirements).

The following examples assume the following prerequisite steps are already done in one or more exemplary embodiments:

1. a local repository 140 with the application code and installation scripts is readily available, as described above;
2. an orchestrator component 710 is running and accessible to end-users;
3. a cloud object 720 responsible for each cloud 130 is running in the multi-cloud application environment 100;
4. the clouds 130 that are part of the multi-cloud application environment 100 have been registered via operation Orchestrator.RegisterCloud( ), so the orchestrator component 710 can get an access token to send commands to them (the Orchestrator may also be referred to herein as Horizon);
5. the Application to be uploaded was registered via operation Orchestrator.RegisterApplication( ).

From Orchestrator Component 710 to Cloud

In this example, the process of uploading an application is outlined. A user calls the operation Orchestrator.UploadApplication( ):

1. the orchestrator component 710 gets a list of clouds this application will be hosted in, as well as which ServiceType to use for each cloud.
2. for each cloud in this list, the orchestrator component 710 calls Cloud.UploadApplication( ) with the application name and the path where the files to be uploaded reside.

Ultimately, the command Cloud.UploadApplication( ) issued by the Cloud Object 330 for each cloud will call the native API provided by the respective cloud 130 in order to upload the application files to their local storage.

From Orchestrator Component 710 to Monitor 740 to Monitor Agent 750

In this example, the steps needed to start the monitoring process of an application are outlined.

The following prerequisite steps are assumed to be already done in one or more exemplary embodiments:

1. a monitor repository 760 (e.g., a data store to store data sent by the monitor 740 should be running;
2. a monitor object 740 is running anywhere in the multi-cloud application environment 100 and connected to the monitor repository 760;
3. a monitor agent object 750 is running for each cloud 130 where monitoring should happen, with is private repository; and
4. the monitor 740 should already have registered each monitor agent 750, so the monitor 740 can access their operations.

The process follows:

1. user calls operation Orchestrator.RegisterMonitor( ) to access the operations of monitor 740;
2. user calls Orchestrator.ConfigureApplicationMonitoring( ) to specify, for each microservice, which metrics the user wants to monitor;
3. the orchestrator component 710 retrieves its stored list of clouds 130 where the application resides, as well as the list of microservices per cloud 130 for the application; and
4. For each cloud and its services in the list, the following steps are performed:
   a. orchestrator component 710 calls operation Monitor.ConfigureCloudServiceMonitoring( ) passing along the cloud name, the microservices to be monitored along with the metrics to monitored on them;
   b. monitor 740 retrieves the monitor agent 750 associated to this cloud;
   c. monitor 740 calls MonitorAgent.StartMonitoringServiceAsync( ) providing the microservices to be monitored as well as the specified metrics for it.

Ultimately, it is the monitor agent 750 that will call the native API of its respective cloud 130 to start monitoring the services on its cloud 130. The monitored data is then stored its local repository.

Going further, if a user wants to get a monitoring report for an application, given a start time and an end time, the user will call the operation Orchestrator.GetApplicationMonitoringReport( ). The orchestrator component 710 will know which clouds to address, so the orchestrator component 710 will be able to issue the operation Monitor.GetCloudMonitoringReport( ) for each one. The monitor object 740 knows which monitor agent 750 is responsible for each cloud 130, and then calls operation MonitorAgent.GetMonitoringReport( ) to each of them. Each monitor agent 750 will look up its local repository and return to the monitor 740 the set of measures for that time period. The monitor 740 will aggregate all results on its monitor repository 760 and return to the orchestrator component 710.

From Orchestrator Component 710 to Application Scheduler 730

In this example, the steps needed to start the application scheduler 730 for a specific application are outlined.

The following prerequisite steps are assumed to be already done in one or more exemplary embodiments:

1. an application scheduler object 730 is running anywhere in the multi-cloud application environment 100 and connected to the monitor repository 760, so the former can query stored data on the latter;
2. the application scheduler object 730 should be registered by the orchestrator component 710 so the orchestrator component 710 can call its operations.

The exemplary process follows:

A user calls the following operation:
Orchestrator.ApplicationScheduler.SetOptimizationMetric( )
in order to inform:
the application the user wants to schedule for optimization;
the metric that will be used for optimization;
the optimization direction (e.g., minimization or maximization); and
the time interval to be used by the optimizer (e.g., 10 min, 30 min, etc.) to generate move plans.

Then, the user can call the following operation:
Orchestrator.Application.StartApplicationScheduler( )
in order to inform the following:
the application;
if the generated move plan will be automatically executed or just returned as a report to the Orchestrator.

From then on, the application scheduler 730 will start to query the monitor repository 760 at specific time intervals to retrieve relevant measures and use it to feed the optimization algorithm and generate the move plan.

It is important to note that, in the description above, the orchestrator component 710 can directly call ApplicationScheduler operations (e.g., Orchestrator.ApplicationScheduler . . . ). This logical representation is different from the scheme Orchestrator>Monitor>MonitorAgent, in that there is no inherent task needed to be done by the orchestrator component 710 before it calls the ApplicationScheduler operations. However, this relationship could have been represented otherwise, for example:

Orchestrator.SetOptimizationMetric( ) calls
ApplicationScheduler.SetOptimizationMetric( ); and
Orchestrator.StartApplicationScheduler calls
ApplicationScheduler.StartApplicationScheduler( ),
and so on.

Alternative Logical Architecture

As noted above, the exemplary logical architecture 700 of FIG. 7 implements the orchestrator component 710, the application scheduler 730 and the monitor 740 as separate components.

Figure 13:
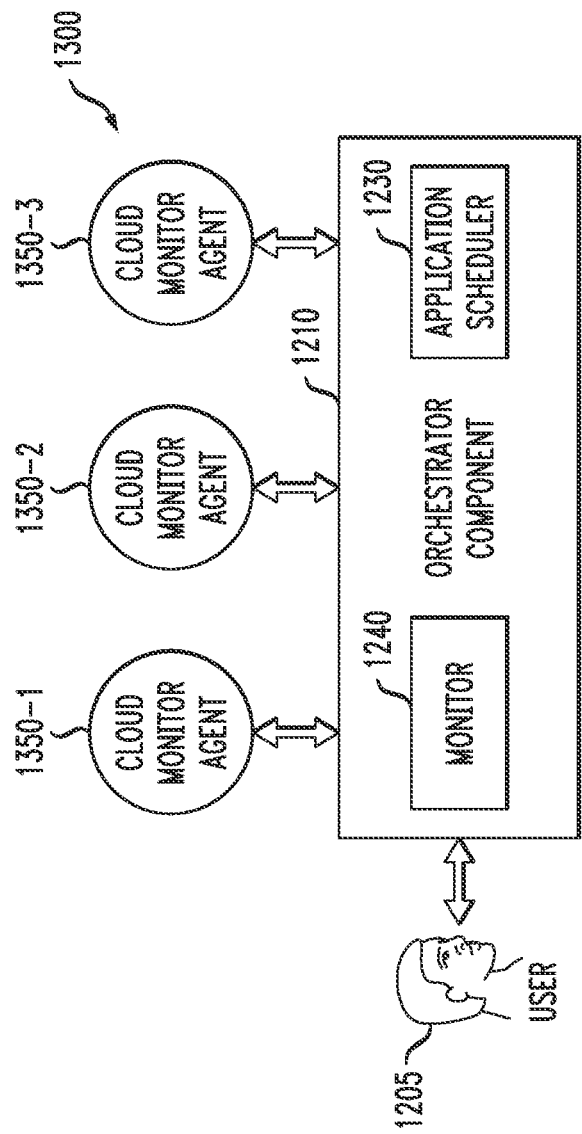
FIG. 13 illustrates an alternate exemplary logical architecture for the disclosed multi-cloud framework, according to one or more embodiments.

FIG. 13 illustrates an alternate exemplary logical architecture 1300 for the disclosed multi-cloud framework, according to one or more embodiments. Generally, as shown in FIG. 13, the exemplary alternate logical architecture 1300 comprises an orchestrator component 1210, an application scheduler 1230 and a monitor 1240 residing on the same physical component. The orchestrator component 1210 allows user 1205 to interact with the disclosed multi-cloud framework via standard operations. In addition, in the exemplary alternate logical architecture 1300 the cloud objects 720 and the monitor agent objects 750 of FIG. 7 are implemented as part of the same physical component, namely, cloud monitor agents 1350-1 through 1350-3, for example, with one cloud monitor agent 1350 provided for each cloud, for example.

In some embodiments, the disclosed multi-cloud framework for microservice-based applications enables an application comprising multiple microservices to be deployed to a plurality of different clouds. Among other benefits, the disclosed multi-cloud framework for microservice-based applications can provide the structural state of an application at a given time (e.g., for each application, identify the microservices running on each cloud, and/or which version of each microservice is currently running). In addition, one or more microservices of an application that are running in one cloud can optionally be moved to another cloud (e.g., to change the structural state 120 of the application in an automatically orchestrated way) and/or the microservice implementation can be changed from one cloud to another cloud (e.g., CaaS to FaaS and vice-versa, as long as the cloud providers provide such services).

One or more embodiments of the disclosure provide improved methods, apparatus and computer program products for deploying an application comprising multiple microservices to a plurality of different clouds. The foregoing applications and associated embodiments should be considered as illustrative only, and numerous other embodiments can be configured using the techniques disclosed herein, in a wide variety of different applications.

It should also be understood that the disclosed multi-cloud framework for microservice-based applications, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for deploying an application comprising multiple microservices to a plurality of different clouds may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based orchestrator component 710, or portions thereof, are illustratively implemented for use by tenants of such a multi-tenant environment.

Cloud infrastructure as disclosed herein can include cloud-based systems such as Amazon Web Services (AWS), GCP and Microsoft Azure. Virtual machines provided in such systems can be used to implement at least portions of a cloud-based orchestrator platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 14 and 15. These platforms may also be used to implement at least portions of other information processing systems in other embodiments.

Figure 14:
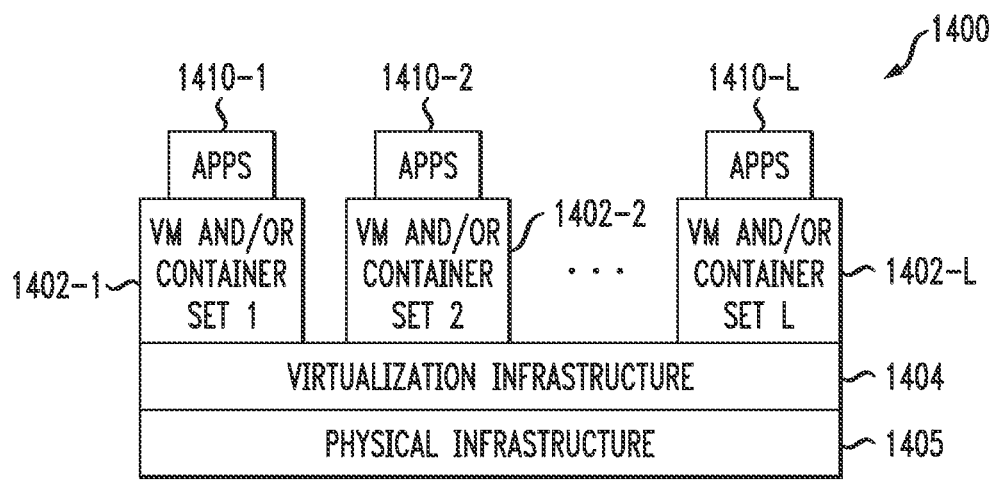
FIG. 14 illustrates an exemplary processing platform that may be used to implement at least a portion of one or more embodiments of the disclosure comprising a cloud infrastructure.

FIG. 14 shows an example processing platform comprising cloud infrastructure 1400. The cloud infrastructure 1400 comprises a combination of physical and virtual processing resources that may be utilized to implement at least a portion of the exemplary logical architecture 700 of FIG. 7. The cloud infrastructure 1400 comprises multiple virtual machines (VMs) and/or container sets 1402-1, 1402-2, . . .

1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. Such implementations can provide microservice-based application deployment functionality of the type described above for one or more processes running on a given one of the VMs. For example, each of the VMs can implement microservice-based application deployment control logic and associated structural states 120 for providing microservice-based application deployment functionality for one or more processes running on that particular VM.

An example of a hypervisor platform that may be used to implement a hypervisor within the virtualization infrastructure 1404 is the VMware® vSphere® which may have an associated virtual infrastructure management system such as the VMware® vCenter™. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system. Such implementations can provide microservice-based application deployment functionality of the type described above for one or more processes running on different ones of the containers. For example, a container host device supporting multiple containers of one or more container sets can implement one or more instances of microservice-based application deployment control logic and associated structural states 120 for use in microservice-based application deployment.

As is apparent from the above, one or more of the processing modules or other components of the exemplary logical architecture 700 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises at least a portion of the given system and includes a plurality of processing devices, denoted 1502-1, 1502-2, 1502-3, . . . 1502-K, which communicate with one another over a network 1504. The network 1504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1502-1 in the processing platform 1500 comprises a processor 1510 coupled to a memory 1512. The processor 1510 may comprise a microprocessor, a microcontroller, an application specific integrated circuit (ASIC), a field programmable gate array (FPGA) or other type of processing circuitry, as well as portions or combinations of such circuitry elements, and the memory 1512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the given system may include additional or alternative processing platforms, as well as numerous distinct processing platforms in any combination, with each such platform comprising one or more computers, storage devices or other processing devices.

Figure 15:
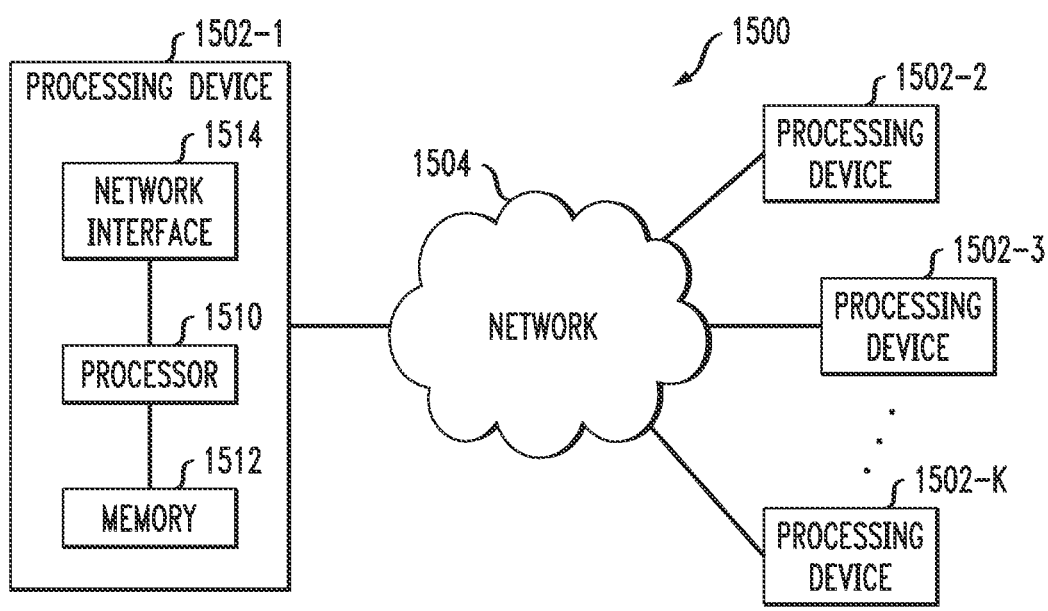
FIG. 15 illustrates another exemplary processing platform that may be used to implement at least a portion of one or more embodiments of the disclosure.

Multiple elements of an information processing system may be collectively implemented on a common processing platform of the type shown in FIG. 14 or 15, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
maintaining, using at least one processing device, a structural state of a multi-cloud application comprising a plurality of microservices hosted in at least two distinct cloud environments, wherein the at least two distinct cloud environments are provided by at least two different cloud providers and execute one or more of the microservices, wherein the structural state of the application is maintained over time and comprises, for each microservice, an indication of the cloud environment that hosts the respective microservice and an indication of one of a plurality of microservice technology types, wherein the plurality of microservice technology types comprises: a Container as a Service type and a Function as a Service type;
obtaining, using the at least one processing device, a source code for each of the plurality of microservices of the multi-cloud application and deployment instructions for each of the distinct cloud environments;
deploying, using the at least one processing device, the plurality of microservices of the multi-cloud application using the structural state of the multi-cloud application, the source code for each of the plurality of microservices and the deployment instructions for each of the distinct cloud environments; and
migrating at least one of the plurality of microservices that is deployed on a first one of the at least two distinct cloud environments to a second one of the at least two distinct cloud environments, wherein at least another one of the plurality of microservices is maintained on the first one of the at least two distinct cloud environments, and wherein the at least one microservice is migrated from a first one of a plurality of microservice technology types to a second one of the plurality of microservice technology types.

2. The method of claim 1, wherein the structural state of the application further comprises, for each microservice, a version identifier.

3. The method of claim 1, further comprising determining a resource cost for one or more of the plurality of microservices of the application hosted by the distinct cloud environments, for a defined time interval.

4. The method of claim 1, further comprising monitoring a resource usage of one or more of the microservices of the application based on one or more user-defined metrics and processing one or more queries with respect to the resource usage.

5. The method of claim 1, further comprising moving one or more of the plurality of microservices to a different cloud environment by manual intervention of a user, such that the structural state of the application remains consistent.

6. The method of claim 1, further comprising moving one or more microservices to a different cloud environment using an automated optimization process based on resource usage data and one or more collected predefined optimization parameters.

7. The method of claim 1, further comprising querying the structural state of the application to obtain one or more of an identifier of one or more of the microservices of the application, an identifier of one of the distinct cloud environments hosting one or more of the microservices of the application, and an identifier of a version of one or more of the microservices of the application.

8. The method of claim 1, wherein an orchestrator component communicates with end users and provides commands to a plurality of cloud-specific components in the distinct cloud environments.

9. The method of claim 8, wherein the plurality of cloud-specific components in the distinct cloud environments employ substantially the same application programming interface.

10. The method of claim 8, wherein the orchestrator component performs one or more of maintaining a coherence of the application across the distinct cloud environments; collecting one or more user-defined metric values from the plurality of cloud-specific components of the distinct cloud environments; and coordinating with an application scheduler to generate a plan to move one or more of the plurality of microservices to a different cloud environment.

11. The method of claim 1, wherein a given one of the distinct cloud environments comprises software scripts for instantiating each of at least two of the microservice technology types.

12. The method of claim 11, wherein the software scripts comprise a first software script for instantiating the Container as a Service type and a second software script, different than the first software script, for instantiating the Function as a Service type.

13. A system, comprising:
a memory; and
at least one processing device, coupled to the memory, operative to implement the following steps:
maintaining a structural state of a multi-cloud application comprising a plurality of microservices hosted in at least two distinct cloud environments, wherein the at least two distinct cloud environments are provided by at least two different cloud providers and execute one or more of the microservices, wherein the structural state of the application is maintained over time and comprises, for each microservice, an indication of the cloud environment that hosts the respective microservice and an indication of one of a plurality of microservice technology types, wherein the plurality of microservice technology types comprises: a Container as a Service type and a Function as a Service type;

obtaining a source code for each of the plurality of microservices of the multi-cloud application and deployment instructions for each of the distinct cloud environments;

deploying the plurality of microservices of the multi-cloud application using the structural state of the multi-cloud application, the source code for each of the plurality of microservices and the deployment instructions for each of the distinct cloud environments; and migrating at least one of the plurality of microservices that is deployed on a first one of the at least two distinct cloud environments to a second one of the at least two distinct cloud environments, wherein at least another one of the plurality of microservices is maintained on the first one of the at least two distinct cloud environments, and wherein the at least one microservice is migrated from a first one of a plurality of microservice technology types to a second one of the plurality of microservice technology types.

14. The system of claim 13, wherein the structural state of the application further comprises, for each microservice, a version identifier.

15. The system of claim 13, further comprising monitoring a resource usage of one or more of the microservices of the application based on one or more user-defined metrics and processing one or more queries with respect to the resource usage.

16. The system of claim 13, further comprising moving one or more of the plurality of microservices to a different cloud environment using one or more of (i) a manual intervention of a user, and (ii) an automated optimization process based on resource usage data and one or more collected predefined optimization parameters.

17. The system of claim 13, wherein an orchestrator component communicates with end users and provides commands to a plurality of cloud-specific components in the distinct cloud environments.

18. A computer program product, comprising a non-transitory machine-readable storage medium having encoded therein executable code of one or more software programs, wherein the one or more software programs when executed by at least one processing device perform the following steps:

maintaining a structural state of a multi-cloud application comprising a plurality of microservices hosted in at least two distinct cloud environments, wherein the at least two distinct cloud environments are provided by at least two different cloud providers and execute one or more of the microservices, wherein the structural state of the application is maintained over time and comprises, for each microservice, an indication of the cloud environment that hosts the respective microservice and an indication of one of a plurality of microservice technology types, wherein the plurality of microservice technology types comprises: a Container as a Service type and a Function as a Service type;

obtaining a source code for each of the plurality of microservices of the multi-cloud application and deployment instructions for each of the distinct cloud environments;

deploying the plurality of microservices of the multi-cloud application using the structural state of the multi-cloud application, the source code for each of the plurality of microservices and the deployment instructions for each of the distinct cloud environments; and migrating one of the plurality of microservices that is deployed on a first one of the at least two distinct cloud environments to a second one of the at least two distinct cloud environments, wherein at least another one of the plurality of microservices is maintained on the first one of the at least two distinct cloud environments, and wherein the at least one microservice is migrated from a first one of a plurality of microservice technology types to a second one of the plurality of microservice technology types.

19. The computer program product of claim 18, wherein the structural state of the application further comprises, for each microservice, a version identifier.

20. The computer program product of claim 18, further comprising at least one of:

monitoring a resource usage of one or more of the microservices of the application based on one or more user-defined metrics and processing one or more queries with respect to the resource usage; and moving one or more of the plurality of microservices to a different cloud environment using one or more of (i) a manual intervention of a user, and (ii) an automated optimization process based on resource usage data and one or more collected predefined optimization parameters.

* * * * *